Feb. 11, 1964 E. A. SALO 3,120,740
HYDRAULIC TORQUE CONVERTOR
Filed June 20, 1957 3 Sheets-Sheet 1

INVENTOR.
ERIC A. SALO
BY *Naylor & Neil*
ATTORNEYS

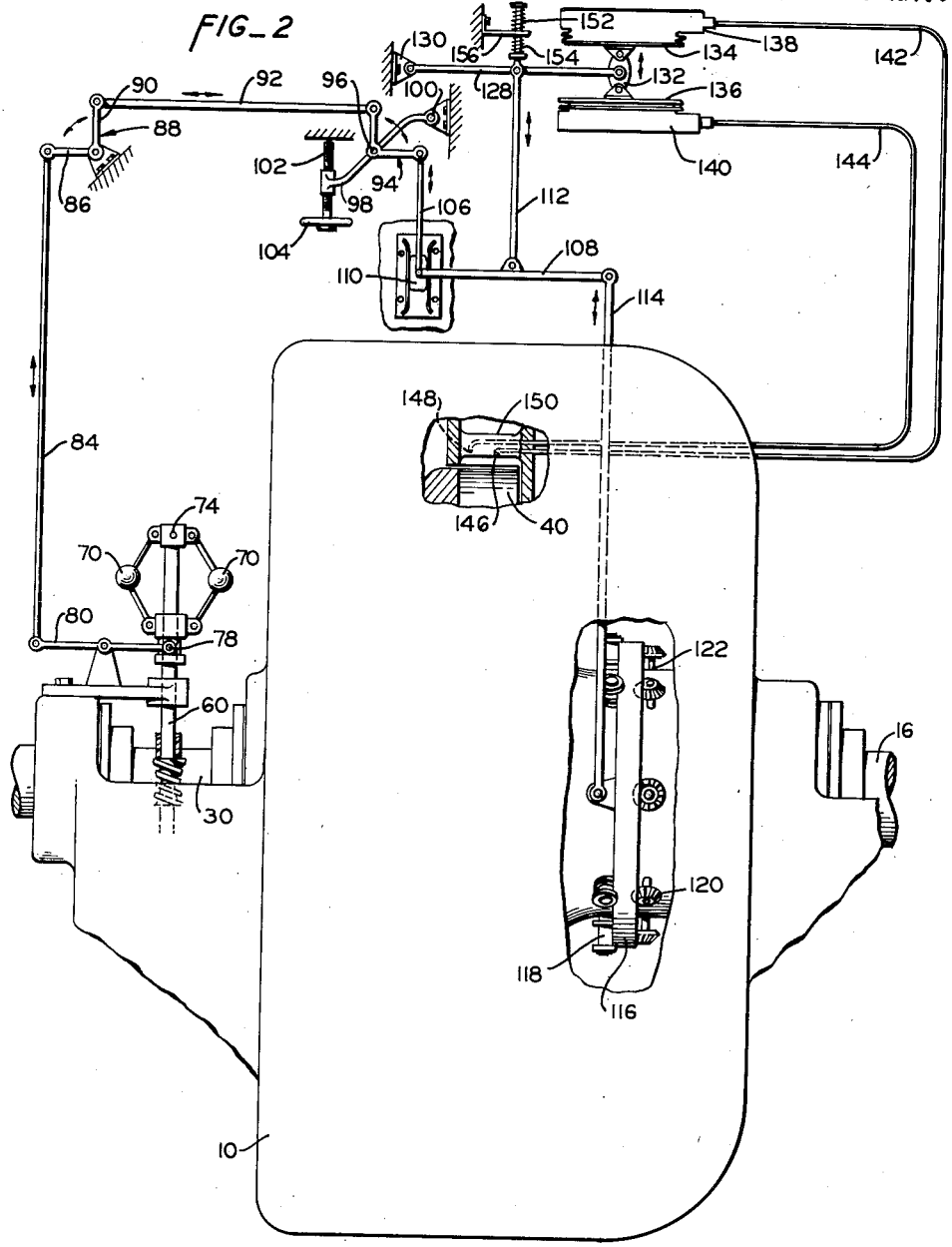

Feb. 11, 1964 E. A. SALO 3,120,740
HYDRAULIC TORQUE CONVERTOR
Filed June 20, 1957 3 Sheets-Sheet 3
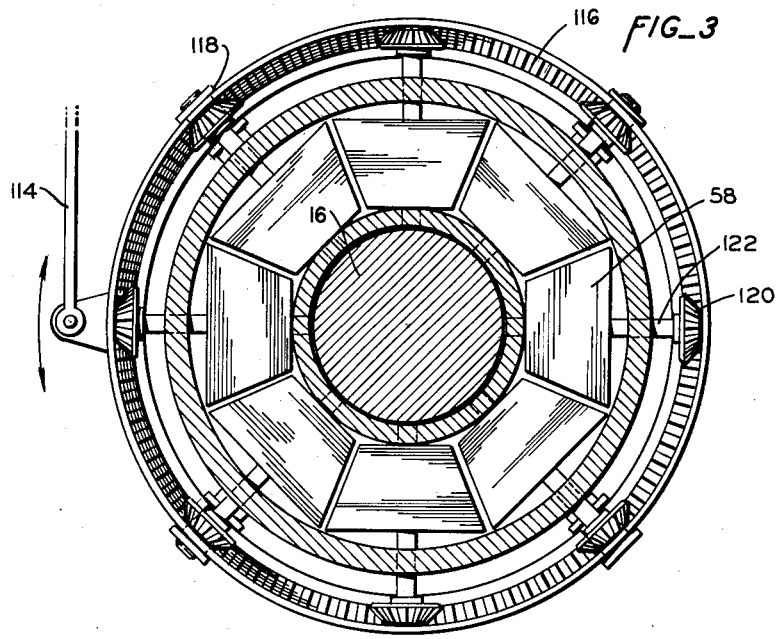
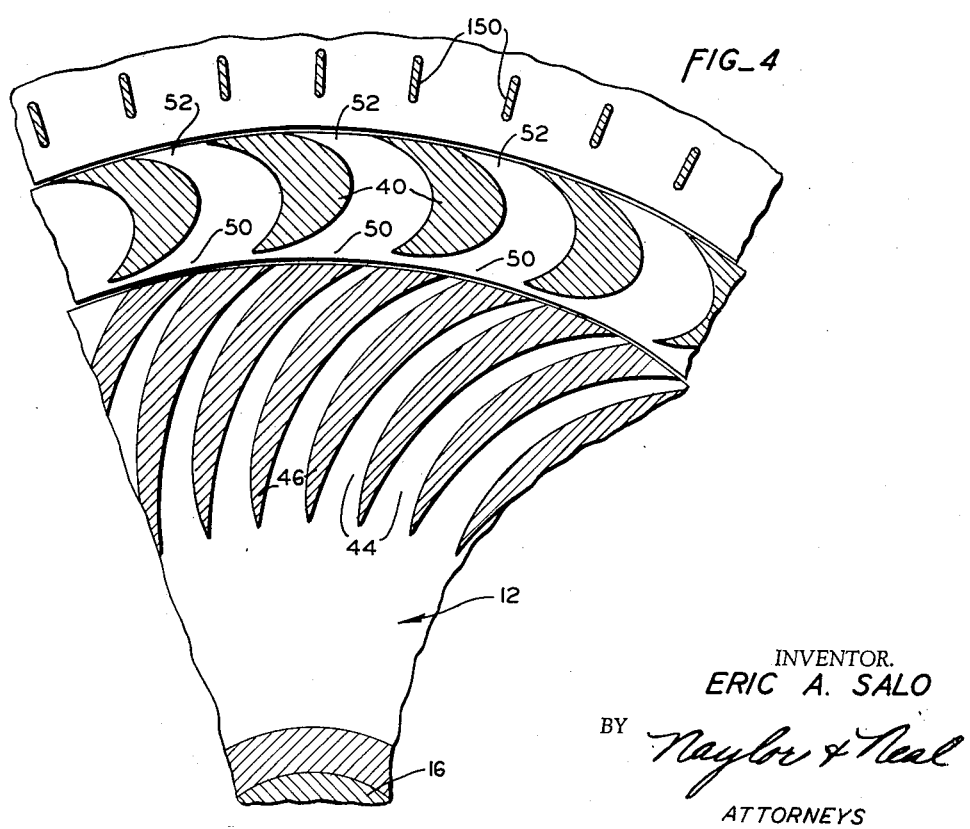
INVENTOR.
ERIC A. SALO
BY Naylor & Neal
ATTORNEYS United States Patent Office 3,120,740
Patented Feb. 11, 1964

3,120,740
HYDRAULIC TORQUE CONVERTOR
Eric A. Salo, 15898 Via Piale, San Lorenzo, Calif.
Filed June 20, 1957, Ser. No. 666,836
6 Claims. (Cl. 60—54)

This invention relates to transmissions, and more particularly to an hydraulic transmission adapted to transmit the rotative energy from one shaft, which operates at a substantially constant speed, to another shaft and cause the latter to rotate at controlled variable speeds up to a maximum speed which is considerably in excess of the maximum speed of rotation of the prime mover shaft. Such transmission of rotative energy is accomplished without the use of gears.

The principal object of the invention is to provide means for coupling electric motor drives that are limited to substantially constant speed to hydraulic pumps which require rotating speeds greater than the maximum of the driving motor.

An important feature of the invention resides in the speed control method, which permits precise control of the output shaft speed over a wide range, from zero to a maximum considerably in excess of the driver shaft speed. The speed control is accomplished in a continuous stepless manner with high mechanical efficiency.

Other objects and advantages of the invention will be apparent from the following description taken in conjunction with the drawings forming part of this specification, and in which:

FIGURE 2 is a view in side elevation, partially broken away, of the transmission of FIGURE 1, showing in a semi-schematic manner the balance of the speed control equipment therefor;

FIGURE 3 is an enlarged view in section taken along lines 3—3 of FIGURE 1; and

FIGURE 4 is an enlarged view in section taken along lines 4—4 of FIGURE 1.

Figure 1:
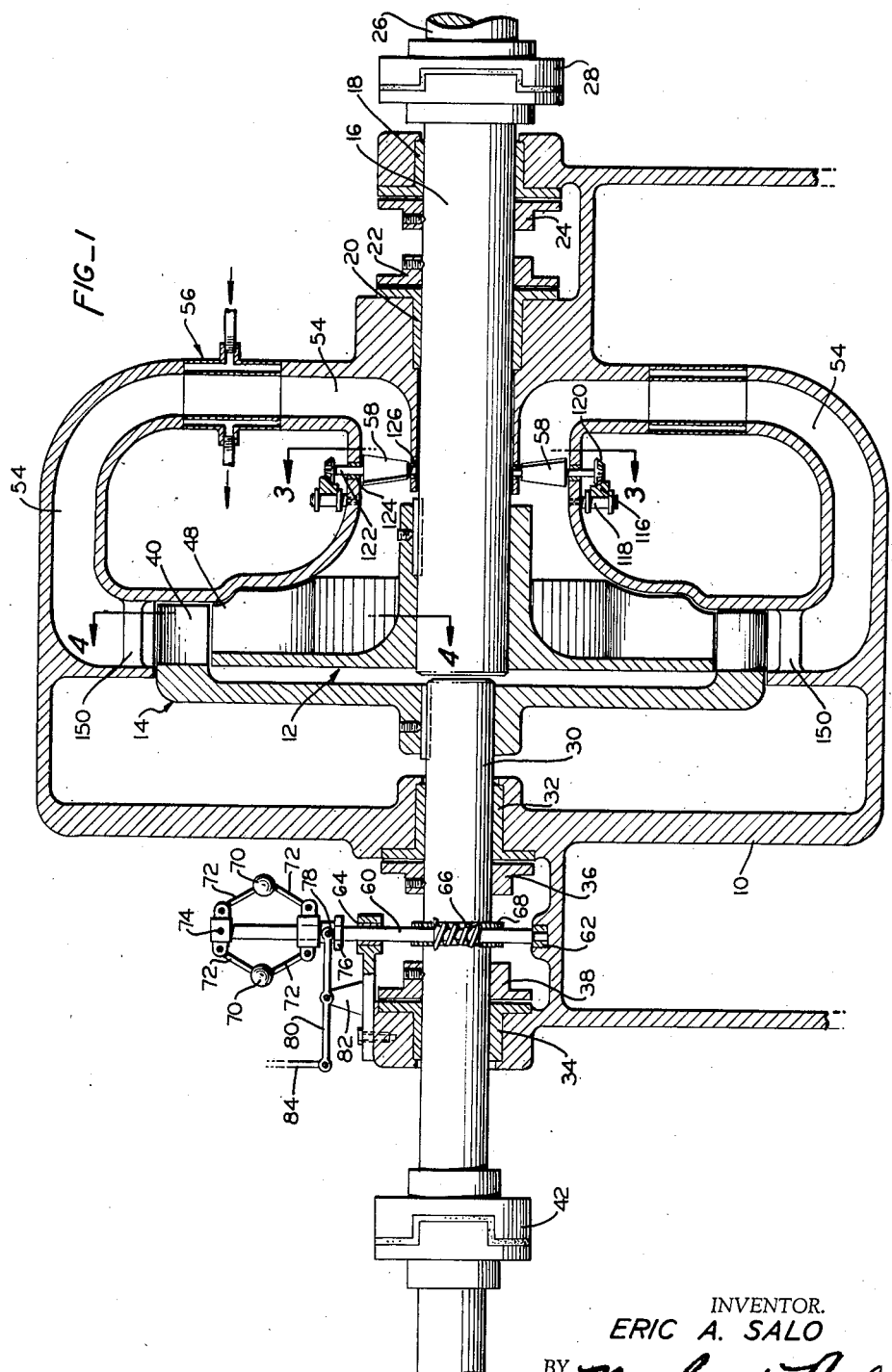
FIGURE 1 is a view in vertical diametral section through a transmission of the invention, with a portion of the control equipment therefor being shown in side elevation.

The transmission is comprised of a casing 10 which provides an enclosure and support for the impeller 12 and the turbine 14, and serves to contain the hydraulic fluid. Impeller 12 is rigidly keyed to impeller shaft 16 which is held in rotatable position by bearings 18 and 20. Thrust collars 22 and 24 are rigidly fixed to shaft 16 and serve to hold the impeller in axial position for operation. A source of rotative energy, such as a substantially constant speed electric motor, not shown, having an output shaft 26, is connected to shaft 16 by means of a mechanical coupling 28, and the shaft and impeller at substantially constant speed. Turbine 14 is rigidly keyed to shaft 30 which is rotatably mounted in bearings 32 and 34 in axial alignment with impeller shaft 16. Thrust collars 36 and 38 are rigidly fixed to shaft 30 and serve to maintain radial alignment of turbine buckets 40 with the impeller discharge. Shaft 30 is provided with a mechanical coupling 42 which drives rotating equipment, not shown.

Rotative energy delivered to shaft 16 causes rotation of the impeller 12 which drives the hydraulic fluid by means of centrifugal force into the turbine buckets 40. Because of the curvature of the impeller channels 44 formed by the impeller volutes 46, the fluid is discharged with a tangential velocity component in the same direction as the rotation of the impeller. The proportions of the impeller 12 and the constriction of the impeller tip, shown at 48 in FIGURE 1, produce a fluid velocity considerably greater than the peripheral speed of the impeller.

The buckets 40 of the turbine receive the fluid flow into the inlets 50 defined between the volutes, or blades, 52. The buckets reverse the direction of flow of the fluid which discharges from the bucket outlets 52 in a direction substantially tangential to the turbine. The bucket inlet area is greater than the outlet area, resulting in a discharge fluid velocity correspondingly greater than the inlet velocity of the fluid, but in nearly the opposite direction. The governor mechanism, hereinafter described, serves to maintain the turbine rotating at a speed which corresponds almost exactly to the velocity of the fluid discharged by the buckets, but in the opposite direction, resulting in a bucket fluid discharge tangential to the turbine of zero rate in reference to the casing 10. As a consequence, practically all of the kinetic energy delivered by the impeller is given up to drive the turbine, except for a small radial velocity of the fluid that serves to drive the fluid through the return ducts 54 and through the fluid cooler 56 and back to the impeller inlet, wherein control vanes 58 are located, and continuously through the impeller and turbine.

The energy imparted to the turbine buckets is utilized in a fashion similar to that in the impulse blading of certain types of steam turbines and also comparable to the Pelton design of hydraulic turbines. It is notable that in the Pelton wheel the operation at maximum efficiency obtains when the peripheral bucket velocity is substantially one half the water jet velocity whereas in the subject device the optimum bucket speed is substantially the same as the bucket discharge fluid velocity, which is much greater than the bucket inlet fluid velocity because the peripheral opening of the turbine bucket channel at the inlet side is considerably greater than the peripheral opening of the channel at the outlet side. Inasmuch as the hydraulic fluid used as the energy transfer medium is essentially incompressible and the volume flow of the fluid is the same at the inlet of the turbine as at the outlet, the velocity at the outlet is greater than at the inlet in direct proportion to the ratio of inlet area to the outlet area.

Stability and efficiency of operation are obtained by the functioning of the governor shown in FIGURES 1 and 2. The governor is comprised of a speed sensing device mounted on spindle 60. The spindle is held rotatably by bearings 62 and 64 which are fastened to the casing 10. On spindle 60 is rigidly mounted worm gear 66 which engages worm wheel 68 which is rigidly mounted on the shaft 30, the arrangement being designed to cause rotation of the spindle 60 in direct relation to the rotation of shaft 24. Spindle 60 is provided with a conventional fly-ball centrifugal governor comprised of weights 70 pinioned on arms 72. The upper arms are mounted at 74 on the spindle and are free to move radially in or out under the influence of centrifugal forces and gravity, but only in the plane common to the arms and the spindle 60. Movement of the weights 70 causes an axial movement of the lower pinion piece 76 which engages fork 78 within a radial channel. Fork 78 forms part of lever 80 which is pivoted on standard 82 which is fixed in position on the casing of the apparatus.

The function of the fly-ball governor is to produce a position of the outer end of the lever 80 that corresponds to the speed of the shaft 30. This governor position is transmitted by linkage 84 to arm 86 of bell crank 88, which is pivotally mounted on the apparatus casing. Movement of crank arm 86 causes the same radial movement of crank arm 90. Motion of arm 90 is transmitted by linkage 92 to bell crank 94. The bell crank 94 is mounted on bearing 96 which is fastened to movable support 98, which support is pivoted on bearing 100, the latter being fixed in relation to the casing. Movable support 98 is threadably engaged with a threaded shaft 102 which is mounted for rotation and provided with a handwheel 104. Bell crank 94 is pivotally connected to a link 106 which is pivotally connected, as is lever 108, to a slidably supported member 110. Lever 108 is pivotally supported by link 112 and has a pivotal connection with link 114.

Link 114 is pivotally connected in control relation with a ring gear 116 which is rotatably supported between bearing spindles 118 and bevel gears 120, being in mesh with the latter. The bevel gears 120 are secured to the ends of spindles 122 which are rotatably supported in bearings 124 and 126 mounted in the casing. The control vanes 58 are secured to the spindles 122. These vanes 58 are positioned in fluid control relation to the inlet of the impeller duct which is in communication with the return, or recirculation, ducts 54.

The position of vanes 58 controls the direction of the inlet flow of the hydraulic fluid to the impeller, said direction of inlet flow being thereby variable from that which is substantially axial of the impeller to that which substantially corresponds to the direction of rotation of the impeller, i.e. radially thereof. By varying the angle of the vanes 58, both the volume of flow of the hydraulic fluid to the impeller and its direction of flow are regulated to provide speed and torque conditions suited to the requirements of the rotative loads, e.g. a pump, coupled to the turbine shaft 30.

Link 112 has a pivotal connection with lever 128, one end of which is pivotally connected to a fixed support member 130 and the other end of which is pivotally connected to a link 132, the ends of which are pivotally connected to the movable diaphragm faces 134 and 136 of fixedly positioned actuator elements 138 and 140. Actuator elements 138 and 140 constitute pressure-responsive control means which are connected through conduits 142 and 144 having their inlets 146 and 148 radially disposed, with respect to the turbine 14, at opposite sides of the leading edges of selected ones of stationary flow straightening vanes 150 disposed at the inlet side of recirculation ducts 54. Link 112 is yieldingly supported by springs 152 and 154 disposed between retainer discs carried by link 112 and a fixed support member 156 through which link 112 extends.

When the governor balls 70 move outwardly from their rest position, the following occurs (with reference to FIGURE 2): lever arm 80 is rocked counter-clockwise and causes link 84 to move downwardly; link 84 rotates bell crank 88 counter-clockwise and this motion is imparted to bell crank 94 through link 92; the counter-clockwise rotation of bell crank 94 about its pivot point 96 raises link 106, thereby imparting clockwise rotation of lever 108 about its pivotal connection with link 112; and link 114 is moved downwardly by lever 108 to impart a degree of rotation to ring gear 116, thus causing the vanes 58 to be moved to a different fluid flow control position.

For any given position of the governor balls, i.e. for any given speed of rotation of turbine shaft 30, the control vanes would normally tend to assume a given position. The handwheel 104 serves as the speed setting control for the apparatus. Through this and its related control elements, the crank arm 94 may be positioned by control movement of its pivotally mounted carrier arm 98 to set the vanes 58 to the position to obtain the desired speed of rotation of the turbine shaft 30. The centrifugal governor thereafter acts to readjust the control vane position to cure any deviation of the turbine speed from the setting made by the handwheel 104.

As previously indicated, the optimum turbine operating speed corresponds to that of the fluid leaving the turbine. In other words, this optimum condition is one in which there is zero tangential flow of the turbine exiting fluid relative to the casing. Under this condition, the fluid pressure in the actuator, or pressure-responsive, elements 138 and 140 is equalized. Once this tangential flow changes from zero to a plus value, the fluid pressure in the actuator elements becomes unbalanced due to the fact that the conduits 142 and 144 communicate with the space within the casing at opposite sides of the leading edges of selected straightener vanes. This pressure imbalance causes a pivotal movement of lever 128 against the yielding action of one or the other of the springs 152, 154 to thereby cause link 112 to move lever 108 and link 114 and effect a supplemental adjustment of the control vanes to reattain a zero tangential flow condition of the fluid leaving the turbine. Means are provided to cool the hydraulic fluid comprising an annular cooler section 56 formed in the casing having a water inlet line 158, an inlet chamber 160 adapted to feed alternating radial passageways, defined by partition means 162 adapted to prevent contact between the coolant and hydraulic fluid, an outlet chamber 164 adapted to receive the coolant from said passageways, and an outlet line 166 in communication with chamber 164. The hydraulic fluid passes through the cooler section 56 and in so doing gives up frictionally induced heat energy obtained during its passage through the impeller and turbine.

I prefer to employ an hydraulic fluid of the phosphate ester type because it is non-flammable, thereby enabling its use for the energy interchanges at relatively high temperatures which favor heat exchange at the cooler.

Having described a preferred embodiment of the invention, what I claim as new and desire to secure by Letters Patent is:

1. An hydraulic transmission comprising driving and driven shafts rotatably mounted in axial alignment in a casing, an impeller fixedly secured to said driving shaft, a turbine fixedly secured to said driven shaft, a plurality of relatively closely and equally spaced radial blades formed on said impeller, said blades having concave leading sides and convex trailing sides, said blades defining therebetween fluid flow passageways which are progressively narrower radially outwardly from the axis of said impeller, whereby said blades may discharge hydraulic fluid from between them with a tangential forward velocity component relative to the rotary motion of said impeller, said turbine having a plurality of relatively closely and evenly spaced buckets formed thereon adjacent to and radially outwardly from said impeller blades and in fluid receiving relation therewith, said buckets having convex leading sides and concave trailing sides, with adjacent buckets defining therebetween reversing fluid flow passageways having inlets of greater cross-sectional area than their outlets, and means for rotating said driving shaft.

2. An hydraulic transmission, according to claim 1, further comprising stationary means defined within said casing forming a fluid recirculation passageway in flow receiving relation to the outlets of said turbine passageways and in flow delivery relation to said impeller, axially thereof.

3. An hydraulic transmission, according to claim 2, further comprising a plurality of fluid flow direction and volume control members adjustably positioned within said recirculation passageway adjacent to the area of said passageway in flow delivery relation to said impeller, and means responsive to the speed of rotation of said driven shaft to effect a positional control of said members.

4. An hydraulic transmission, according to claim 3, said members comprising vanes mounted for pivotal movement about axes extending radially with respect to said casing, said vanes being movable from positions in which they are parallel to the axis of said impeller to positions in which they are disposed transversely to the axis of said impeller to thereby control the volume and direction of fluid flow from said recirculation passageway to said impeller.

5. An hydraulic transmission comprising driving and driven shafts rotatably mounted in axial alignment in a casing, an impeller fixedly secured to said driving shaft, a turbine fixedly secured to said driven shaft, a plurality of relatively closely and equally spaced radial blades disposed on said impeller, said blades having concave leading sides and convex trailing sides, said blades defining therebetween fluid flow passageways which are progressively narrower radially outwardly from the axis of said impeller, whereby said blades may discharge hydraulic fluid from between them with a tangential forward velocity component relative to the rotary motion of said impeller, said turbine having a plurality of relatively closely and evenly spaced buckets disposed thereon adjacent to and radially outwardly from said impeller blades and in fluid receiving relation therewith, said buckets having convex leading sides and concave trailing sides, and means for rotating said driving shaft.

6. An hydraulic transmission comprising driving and driven shafts rotatably mounted in axial alignment in a casing having defined therein a toroidal fluid flow passageway having outward and inward flow portions, impeller and turbine elements fixedly disposed, respectively, on said driving and driven shafts and disposed in the outward flow portion of said pasageway, means for rotating said driving shaft, means embodied in said impeller element operable to pass fluid therethrough and discharge it from the periphery of said element with a tangential component of velocity in the direction of rotative movement of said element greater than the peripheral velocity of said element, a plurality of fluid flow direction and volume control members adjustably positioned within the inward flow portion of said passageway, means responsive to the speed of rotation of said driven shaft to effect positional control of said members, fluid flow straightener vanes radially disposed in said casing in the outward flow portion of said passageway, and fluid pressure sensitive means in communication with the space within said casing through opposite sides of at least one of said straightener vanes responsive to differences between the fluid pressure conditions at said opposite sides to effect a further positional control of said members.

References Cited in the file of this patent

UNITED STATES PATENTS

| | | |
|---|---|---|
| 1,773,985 | Fraser | Aug. 26, 1930 |
| 2,159,143 | Fottinger | May 23, 1939 |
| 2,327,647 | Jandasek | Aug. 24, 1943 |
| 2,612,755 | Szczeniowski | Oct. 7, 1952 |
| 2,645,086 | Carter | July 14, 1953 |
| 2,663,148 | Jandasek | Dec. 22, 1953 |
| 2,720,952 | Alexandrescu | Oct. 18, 1955 |
| 2,758,442 | Fast | Aug. 14, 1956 |

FOREIGN PATENTS

| | | |
|---|---|---|
| 28,507 | Great Britain | Dec. 13, 1906 |
| 444,171 | Great Britain | Mar. 16, 1936 |

OTHER REFERENCES

Ser. No. 266,723, Salerni (A.P.C.), published June 15, 1943.